United States Patent
Kunz et al.

(10) Patent No.: US 11,430,999 B2
(45) Date of Patent: Aug. 30, 2022

(54) SEPARATOR PLATE FOR AN ELECTROCHEMICAL SYSTEM

(71) Applicant: REINZ-DICHTUNGS-GMBH, Neu-Ulm (DE)

(72) Inventors: Claudia Kunz, Ulm (DE); Joachim Scherer, Ulm (DE); Thomas Stoehr, Laupheim (DE)

(73) Assignee: REINZ-DICHTUNGS-GMBH, Neu-Ulm (DE)

( * ) Notice: Subject to any disclaimer, the term of this patent is extended or adjusted under 35 U.S.C. 154(b) by 220 days.

(21) Appl. No.: 16/471,884

(22) PCT Filed: Dec. 18, 2017

(86) PCT No.: PCT/EP2017/083345
§ 371 (c)(1),
(2) Date: Jun. 20, 2019

(87) PCT Pub. No.: WO2018/114819
PCT Pub. Date: Jun. 28, 2018

(65) Prior Publication Data
US 2019/0319279 A1    Oct. 17, 2019

(30) Foreign Application Priority Data

Dec. 22, 2016 (DE) ............. 20 2016 107 302.2

(51) Int. Cl.
*H01M 8/0258* (2016.01)
*H01M 8/0267* (2016.01)
(Continued)

(52) U.S. Cl.
CPC ....... *H01M 8/0258* (2013.01); *H01M 8/0267* (2013.01); *H01M 8/1004* (2013.01); *H01M 8/188* (2013.01)

(58) Field of Classification Search
CPC combination set(s) only.
See application file for complete search history.

(56) References Cited

U.S. PATENT DOCUMENTS 6,472,094 B1 * 10/2002 Nonoyama ........... H01M 8/026
429/492

FOREIGN PATENT DOCUMENTS

DE    102014112607 A1    3/2016
DE    202015104972 U1    12/2016
(Continued)

OTHER PUBLICATIONS

China National Intellectual Property Administration, Office Action and Search Report Issued in Application No. 201780078587.X, dated Sep. 15, 2021, 14 pages.

*Primary Examiner* — Ula C Ruddock
*Assistant Examiner* — Sarika Gupta
(74) *Attorney, Agent, or Firm* — McCoy Russell LLP

(57) ABSTRACT

A separator plate for an electrochemical system is described. The separator plate may be used with a bipolar plate and for an electrochemical system comprising a plurality of bipolar plates. The separator plate may have a flow field and guiding structures for guiding a medium through the flow field. The guiding structures of the flow field have a mean height $h_1$ determined perpendicularly to the planar surface plane of the plate. The separator plate may also have a contiguous, lowered transition region where medium flowing from a channel into the flow field, or from the flow field into the channel, flows through the transition region, wherein the transition region has a maximum height $h_{max}$ determined perpendicularly to the planar surface plane of the plate, where applies: $h_{max} \leq 0.95 \cdot h_1$.

21 Claims, 9 Drawing Sheets

(51) Int. Cl.
*H01M 8/1004* (2016.01)
*H01M 8/18* (2006.01)

(56) References Cited

FOREIGN PATENT DOCUMENTS

| EP | 23485677 | A1 | | 7/2011 | | |
|---|---|---|---|---|---|---|
| EP | 2348567 | B1 | * | 11/2013 | .......... | H01M 8/0267 |
| WO | 2011033745 | A1 | | 3/2011 | | |

* cited by examiner

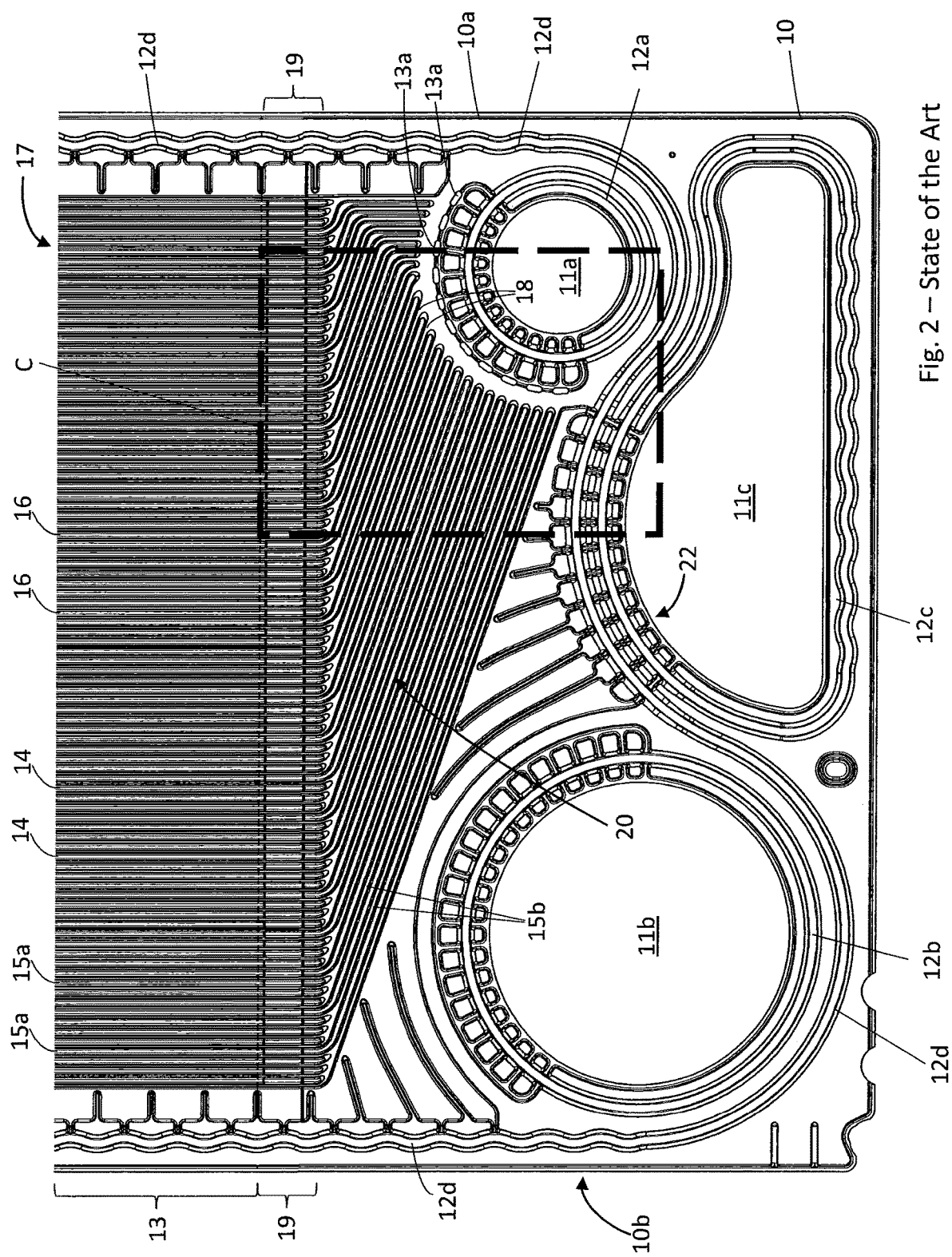
Fig. 2 – State of the Art

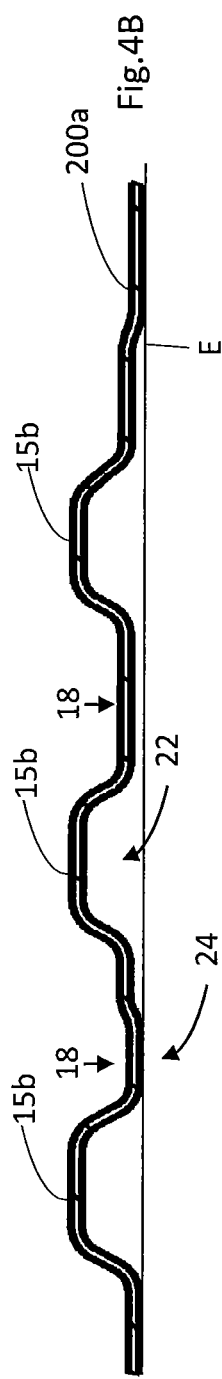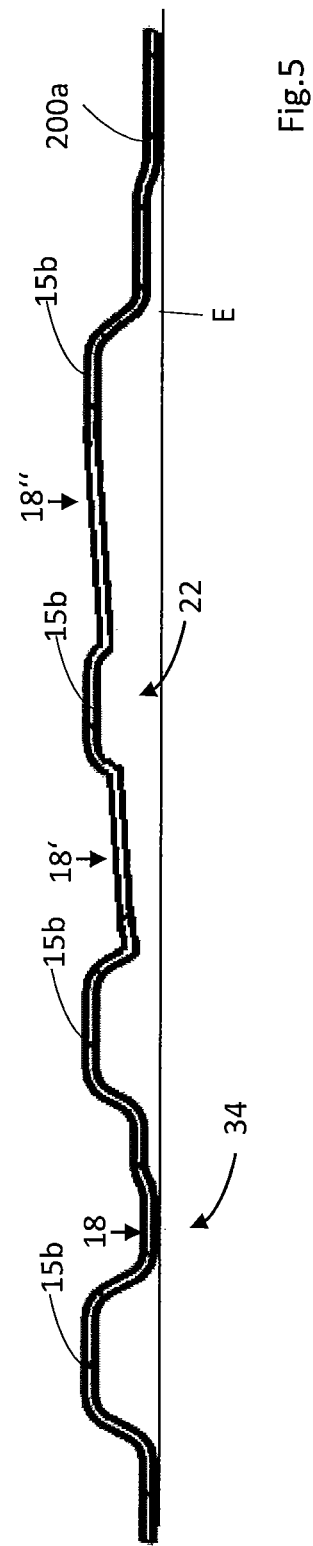

SEPARATOR PLATE FOR AN ELECTROCHEMICAL SYSTEM

BACKGROUND

The invention relates to a separator plate for an electrochemical system, to a bipolar plate for an electrochemical system comprising such a separator plate, and to an electrochemical system comprising a plurality of such separator plates or bipolar plates. In particular, the electrochemical system can be a fuel cell system, an electrochemical compressor, an electrolyzer or a redox flow battery.

Known electrochemical systems of the aforementioned type normally comprise a stack of electrochemical cells, which are separated from one another by bipolar plates. Such bipolar plates can be used, for example, to establish electrical contact with the electrodes of the individual electrochemical cells (such as fuel cells) and/or to electrically connect adjoining cells (series connection of the cells). Typically, the bipolar plates are formed of two joined individual plates, which are also referred to as separator plates within the scope of the present document. The individual plates can be integrally joined, for example by one or more welded joints, and in particular by one or more laser welded joints.

The bipolar plates or the individual plates can comprise or form respective structures, which are configured, for example, to supply the electrochemical cells arranged between adjoining bipolar plates with one or more media and/or to remove reaction products. The media can be fuels (such as hydrogen or methanol), reaction gases (such as air or oxygen) or coolants. Moreover, the bipolar plates can be designed to pass on the waste heat that is generated during the conversion of electric or chemical energy in the electrochemical cell and to seal the different media channels or cooling channels with respect to one another and/or with respect to the outside.

Moreover, the bipolar plates usually include at least one respective through-opening, through which the media and/or the reaction products can be conducted to the electrochemical cells arranged between adjoining bipolar plates of the stack or away therefrom. The electrochemical cells typically also each comprise one or more membrane electrode assemblies (MEAs). The MEAs can comprise one or more gas diffusion layers, which are usually oriented toward the bipolar plates and designed, for example, as metal or carbon nonwoven.

In particular in the reinforced edge regions of the MEA, increased deformations of the bipolar plates, overpressing of the gas diffusion layer or MEA and/or an impairment of the flow of media can occur during compression of the bipolar plates and of the MEA arranged between the bipolar plates. This can reduce the service life and the efficiency of the system.

SUMMARY

It is therefore the object of the present invention to create a separator plate for an electrochemical system which overcomes the above-described disadvantages to the greatest extent possible and, during operation, ensures the longest service life possible and best efficiency possible. Moreover, a bipolar plate, which includes such a separator plate, and an electrochemical system comprising a plurality of corresponding separator plates or bipolar plates are to be created.

This object is achieved by a separator plate according to claim 1, by a bipolar plate comprising such a separator plate, and by an electrochemical system comprising a plurality of such separator plates or bipolar plates. Specific embodiments are described in the dependent claims.

Thus, a separator plate for an electrochemical system is proposed, comprising:
at least one first through-opening in the plate for conducting a medium through the plate;
a distribution or collection region comprising a plurality of lands and channels formed between the lands, which are each in fluid connection with the through-opening;
a flow field, which by way of the distribution or collection region is in fluid connection with the through-opening and comprises guiding structures for guiding a medium through the flow field, wherein the guiding structures of the flow field have a mean height $h_1$ determined perpendicularly to the planar surface plane of the plate;
a contiguous, lowered transition region, which is arranged between the distribution or collection region and the flow field in such a way that, for each of the channels of the distribution or collection region, medium flowing from the channel into the flow field, or from the flow field into the channel, flows through the transition region, wherein the transition region has a maximum height $h_{max}$ determined perpendicularly to the planar surface plane of the plate, where applies: $h_{max} \leq 0.95 \cdot h_1$.

The mean height $h_1$ can denote the mean maximum height of the guiding structures of the flow field. If the guiding structures of the flow field are designed as lands, for example, the maximum height of these lands can be determined in each case along a roof or an apex of these lands. The heights $h_{max}$ and $h_1$ preferably each denote the distance with respect to the planar surface plane of the separator plate which is determined perpendicularly to the planar surface plane of the separator plate. The planar surface plane of the separator plate is given, for example, by an edge of the separator plate or by the flat regions of a metal sheet, of which the separator plate is made, which are not deformed as a result of a stamping or deep drawing process for forming the guiding structures of the flow field and/or for forming the lands of the distribution or collection region.

When the separator plate is arranged in an electrochemical system that comprises a plurality of separator plates of the proposed type and MEAs arranged between the separator plates, a catalyst-coated ionomer, a frame-shaped reinforcing layer and gas diffusion layer(s) can overlap at the edge of the flow field extending around the flow field, whereby this region of the MEA has a greater thickness than the remaining region of the MEA. The lowered transition region can then be used to accommodate this reinforced region of the MEA abutting the separator plate. In this way, compression of the MEA occurring during the pressing of the plate and the MEA can be reduced, and the service life thereof can thus be extended. Moreover, a negative influence on the media flow in the region of the flow field can be reduced or suppressed by accommodating the reinforced edge region of the MEA outside the flow field, and thus outside the electrochemically active region of the separator plate.

The lands of the distribution or collection region can have a mean height $h_2$ determined perpendicularly to the planar surface plane of the plate. Here, it may apply: $h_{max} \leq 0.9 \cdot h_2$. The mean height $h_2$ can denote the mean maximum height of the lands of the distribution or collection region, which is determined, for example, along a roof or an apex of these lands. The height $h_2$ preferably again denotes the distance with respect to the planar surface plane of the separator plate which is determined perpendicularly to the planar surface plane of the separator plate.

The lowered transition region can have a straight progression transversely to the flow direction of the medium through the transition region, or substantially transversely to the flow direction of the medium through the transition region. In other words, the lowered transition region preferably has a substantially rectangular shape, wherein it is possible for the transition region to extend considerably further in a direction transverse to the guiding structures of the flow field than in a direction of the guiding structures of the flow field.

The guiding structures of the flow field can comprise a plurality of lands and, if necessary, channels formed between the lands. The lands of the flow field can extend at least partially into the transition region.

The lands of the distribution or collection region can extend through the transition region and transition into lands of the flow field. These lands extending through the transition region are then usually lowered in the transition region.

Further lands may be arranged in the area of the flow field between the lands of the flow field transitioning into lands of the distribution or collection region. These further lands of the flow field can extend into the lowered transition region. For example, at least every twelfth or at least every sixth of these further lands of the flow field can extend into the lowered transition region.

The lands extending through the transition region and/or extending into the transition region can have the same maximum height $h_{max}$ in transition region.

The flow field can have a number n1 of channels, and the distribution or collection region can have a number $n_2$ of channels. It may apply: $n_1 \geq 2 \cdot n_2$, and preferably $n_1 \geq 3 \cdot n_2$.

A depth of at least one of the channels of the distribution or collection region which is determined perpendicularly to the planar surface plane of the plate can vary so as to influence the flow direction of the medium. Similarly to the distribution or collection region, however, channels for media conduction can also be formed between the lands that are arranged in the transition region or that extend through the distribution or collection region. As an alternative or in addition to the channels of the distribution or collection region, the channels in the transition region or at least one of the channels in the transition region can also have a depth that varies so as to influence the flow direction of the medium, wherein the depth of the channels in the transition region is again determined perpendicularly to the planar surface plane of the plate.

For example, the depth of at least one channel of the transition region and/or of the distribution or collection region can vary along the progression thereof. As an alternative or in addition, the depth of at least one channel of the transition region and/or of the distribution or collection region can also vary transversely to the flow direction of the medium in the channel or through the channel.

The separator plate can moreover comprise a bead, which completely encloses the through-opening in the separator plate so as to seal the through-opening. This bead can include passages for conducting a medium through the bead. The channels of the distribution or collection region can then be in fluid connection with the through-opening by way of these passages in the bead.

Moreover, a bipolar plate for an electrochemical system is proposed, which comprises a first separator plate of the above-described type and a second separator plate. Usually, the first and second separator plates are joined, preferably by way of one or more integral joints. The integral joints can be designed as welded joints, for example, and in particular as laser welded joints. Similarly to the first separator plate, the second separator plate likewise includes at least one through-opening. So as to form at least one through-opening in the bipolar plate, the through-openings of the first and second separator plates are aligned with one another. Advantageously, however, the number of through-openings that the bipolar plate includes is such that at least one feed opening and one discharge opening are present for each medium, that is, for example, two through-openings each for fuel, reaction gas and coolant.

It may be provided that only the first separator plate is designed as described above and includes a lowered transition region between the distribution or collection region and the flow field. Preferably, the following then applies to the maximum height $h_{max}$ of the transition region of the first separator plate and to the maximum height $h_1$ of the guiding structures of the flow field of the first separator plate: $h_{max} \leq 0.9 \cdot h_1$.

Likewise, it is conceivable that, in addition to the first separator plate of the bipolar plate, the second separator plate of the bipolar plate is also designed as described above. In this case, the second separator plate of the bipolar plate then also comprises the following:

a distribution or collection region comprising a plurality of lands and channels formed between the lands, which are each in fluid connection with the through-opening of the bipolar plate;

a flow field, which by way of the distribution or collection region of the second separator plate is in fluid connection with the through-opening of the bipolar plate and comprises guiding structures for guiding a medium through the flow field, wherein the guiding structures of the flow field of the second separator plate have a mean height $h_{12}$ determined perpendicularly to the planar surface plane of the second separator plate; and a contiguous, lowered transition region, which is arranged between the distribution or collection region of the second separator plate and the flow field of the second separator plate in such a way that, for each of the channels of the distribution or collection region of the second separator plate, medium flowing from the channel into the flow field of the second separator plate, or from the flow field of the second separator plate into the channel, flows through the transition region of the second separator plate, wherein the transition region of the second separator plate has a maximum height $h_{max,2}$ determined perpendicularly to the planar surface plane of the second separator plate or the bipolar plate, where applies: $h_{max,2} \leq 0.95 \cdot h_{12}$.

In particular, the following can also apply to the maximum height $h_{max,1}$ of the transition region of the first separator plate and to the maximum height $h_{11}$ of the guiding structures of the flow field of the first separator plate: $0.85 \, h_{11} \leq h_{max,1} \leq 0.95 \cdot h_{11}$. At the same time, the following can then apply to the maximum height $h_{max,2}$ of the transition region of the second separator plate and to the maximum height $h_{12}$ of the guiding structures of the flow field of the second separator plate: $0.85 \, h_{12} \leq h_{max,2} \leq 0.95 \cdot h_{12}$.

The first separator plate and the second separator plate of the bipolar plate can be designed and joined so as to enclose an intermediate space for coolant conduction. The above-described variation of the depth of at least one channel of the transition region and/or of the distribution or collection region along or transversely to the progression of the channel can, in particular, positively influence the distribution of the coolant. In principle, such a variation can take place steadily or in a stepped manner. In particular, the bottom of a channel can extend obliquely, transversely to the direction of extension thereof. A decrease in the depth of a channel results in an increase in the space available for coolant conduction.

Moreover, an electrochemical system is proposed, and in particular a fuel cell system, an electrochemical compressor, an electrolyzer or a redox flow battery, comprising a plurality of stacked bipolar plates of the above-described type and comprising a plurality of MEAs arranged between the stacked bipolar plates. The MEAs each comprise an active region having a first thickness and a reinforced region having a second thickness which is increased compared to the first thickness. The MEAs and the bipolar plates are arranged in such a way that the respective reinforced region of the MEAs is accommodated in the lowered transition region of a bipolar plate abutting the respective MEA.

Typically, the membrane electrode assemblies, in the active region, comprise a respective membrane electrode comprising an ionomer and at least one catalyst layer, and preferably a membrane electrode and at least one gas diffusion layer (GDL). In the reinforced region, the membrane electrodes or combinations of membrane electrodes and GLD(s) can additionally comprise at least one, in particular frame-shaped, reinforcing layer, and preferably at least one reinforcing layer and at least one adhesive layer. The adhesive layer may also penetrate into the other layers. Usually, the membrane electrode, the gas diffusion layer(s) and the reinforcing layers together form the membrane electrode assembly (MEA).

BRIEF DESCRIPTION OF THE DRAWINGS

Exemplary embodiments of the invention are shown in the figures and will be described in greater detail based on the following description. In the drawings:

FIG. 2 shows a bipolar plate known from the prior art in a top view;

FIG. 4B shows a sectional view of an individual plate of the bipolar plate from FIG. 4A along a cutting line B-B shown in FIG. 4A;

FIG. 5 shows a further sectional view of a section of the bipolar plate;

DETAILED DESCRIPTION

Figure 1:
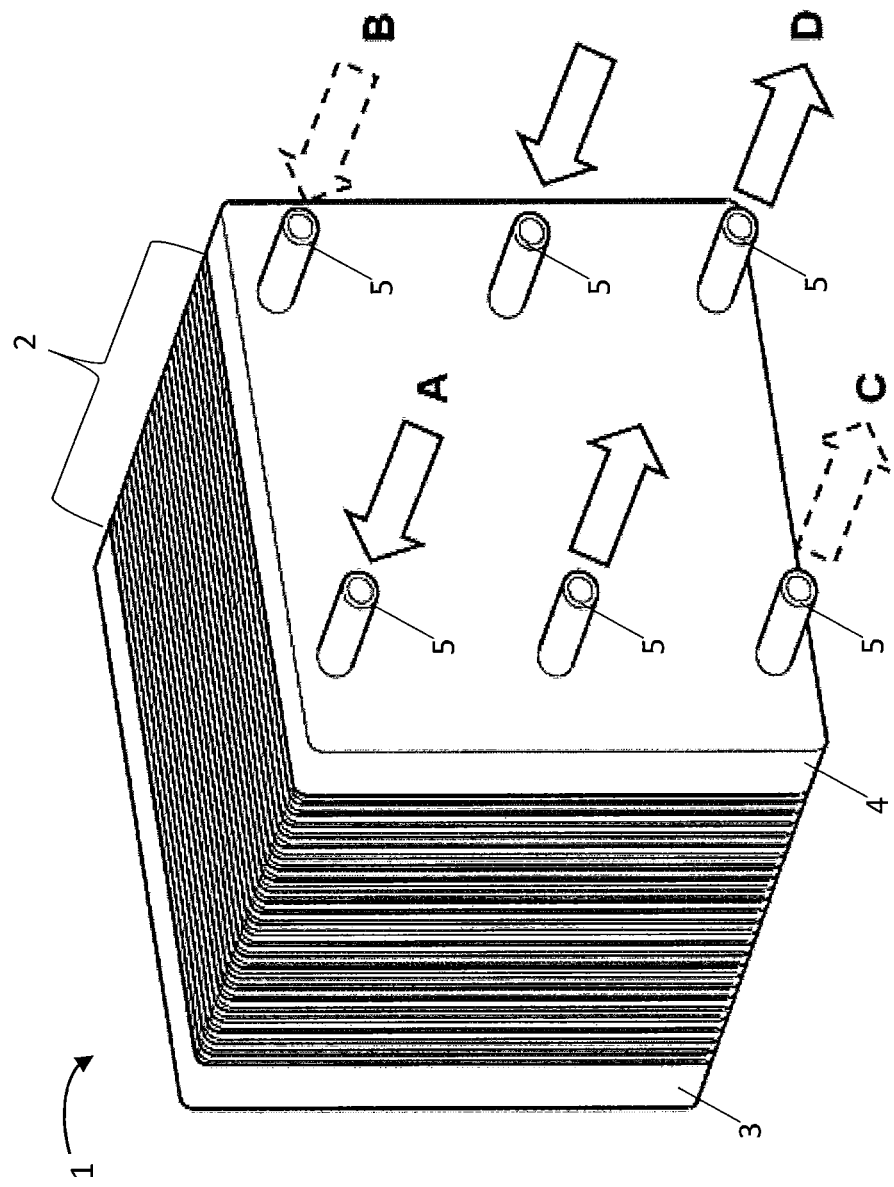
FIG. 1 shows a perspective illustration of an electrochemical system comprising a plurality of stacked bipolar plates and membrane electrode assemblies arranged between the bipolar plates.

FIG. 1 shows an electrochemical system 1 comprising a stack 2 including a plurality of identical bipolar plates, which are stacked along a z-direction 7 and clamped between two end plates 3, 4. Each of the bipolar plates comprises two mutually connected individual plates, which are also referred to as separator plates in this document. In the present example, the system 1 is a fuel cell stack. Two adjoining bipolar plates of the stack 2 in each case also enclose an electrochemical cell, which is used to convert chemical energy into electric energy. The electrochemical cells each include a membrane electrode assembly (MEA) and gas diffusion layers (GDL), for example. In alternative embodiments, the system 1 can also be designed as an electrolyzer, as a compressor or as a redox flow battery. Bipolar plates can also be used in these electrochemical systems. The design of these bipolar plates corresponds to the design of the bipolar plates described here in more detail, even though the media conducted on or through the bipolar plates may differ.

Together with an x-axis 8 and a y-axis 9, the z-axis 7 spans a right-handed Cartesian coordinate system. The end plate 4 includes a plurality of ports 5 via which media can be supplied to the system 1 and via which media can be discharged from the system 1. These media that can be supplied to the system 1 and discharged from the system 1 can include, for example, fuels such as molecular hydrogen or methanol, reaction gases such as air or oxygen, reaction products such as water vapor, or coolants such as water and/or glycol.

FIG. 2 shows a section of a bipolar plate 10 known from the prior art, which can be used, for example, in an electrochemical system of the type of system 1 from FIG. 1. Here and hereafter, recurring features are denoted by the same reference numerals. The bipolar plate 10 is formed of two integrally joined individual plates or separator plates 10a, 10b, of which only the first separator plate 10a is visible in FIG. 2, which hides the second separator plate 10b. The separator plates 10a, 10b can be made of sheet metal, such as stainless steel sheet. The separator plates 10a, 10b have mutually aligned through-openings, which form through-openings 11a, 11b, 11c of the bipolar plate 10. When a plurality of bipolar plates of the type of bipolar plate 10 are stacked, the through-openings 11a-c form ducts extending through the stack 2 in the stacking direction 7 (see FIG. 1). Typically, each of the ducts formed by the through-openings 11a-c is in fluid connection with one of the ports 5 in the end plate 4 of the system 1. For example, the ducts formed by the through-openings 11a, 11b are used to supply the electrochemical cells of the fuel cell stack 2 with fuel and with reaction gas. In contrast, coolant can be introduced into the stack 2 or removed from the stack 2 via the duct formed by the through-opening 11c.

So as to seal the through-openings 11a-c with respect to the inside of the stack 2 and with respect to the surrounding area, the first separator plate 10a comprises beads 12a, 12b, 12c, which are each arranged around the through-openings 11a-c and each completely enclose the through-openings 11a-c. On the rear side of the bipolar plate 10 facing away from the observer of FIG. 2, the second separator plate 10b comprises appropriate beads for sealing the through-openings 11a-c (not shown).

In an electrochemically active region 13 of the bipolar plate 10, the first separator plate 10a, on the front side thereof facing the observer of FIG. 2, comprises a flow field 17 including a plurality of lands 14, 15a and channels 16 extending between the lands 14, 15a and delimited by the lands 14, 15a. FIG. 2 only shows a section of the active region 13 on the front side of the bipolar plate 10. On the front side of the bipolar plate 10 facing the observer of FIG. 2, the first separator plate 10a moreover includes a distribution or collection region 20, which comprises lands 15b and channels 18 extending between the lands 15b and delimited by the lands 15b. The lands 15b of the distribution or collection region 20 are continuations of the lands 15a of the flow field 17. This means that the lands 15a of the flow field 17 transition into the lands 15b of the distribution or collection region 20. For the sake of clarity, only a few of the lands 14, 15a, 15b of the channels 16, 18 in FIG. 2 are denoted by reference numerals.

By way of passages 13a through the bead 12a, the channels 18 of the distribution or collection region 20 of the first separator plate 10a are in fluid connection with the through-opening 11a or with the duct formed by the through-opening 11a through the stack 2. Again for the sake of clarity, only a few of the passages 13a through the bead 12a in FIG. 2 are denoted by reference numerals. Likewise, the channels 18 of the distribution or collection region 20 are in fluid connection with the channels 16 of the flow field 17. In this way, a medium conducted through the through-opening 11a, by way of the passages 13a in the bead 12a and by way of the channels 18 of the distribution or collection region 20, can be conducted into the channels 16 of the flow field 17 in the active region 13 of the bipolar plate 10.

The through-opening 11b, or the duct formed by the through-opening 11b, through the stack 2 is accordingly in fluid connection with a distribution or collection region 20 and, via this region, with a flow field on the rear side of the bipolar plate 10 facing away from the observer of FIG. 2. In contrast, the through-opening 11c, or the duct formed by the through-opening 11c, through the stack 2 is in fluid connection with an intermediate space 22, which is enclosed or surrounded by the separator plates 10a, 10b and which is designed to conduct a coolant through the bipolar plate 10.

Finally, the first separator plate 10a comprises a further bead 12d, which extends around the flow field 17, the distribution or collection region 20 and the through-openings 11a, 11b and seals these, that is, the gas compartments, with respect to the through-opening 11c, that is, with respect to the coolant circuit, and with respect to the surrounding area of the system 1. The lands 14, 15a, 15b and the beads 12a-d are designed in one piece with the separator plate 10a and integrally formed in the separator plate 10a, for example in a stamping process or a deep drawing process.

In FIG. 2 moreover a rectangular edge region 19 of the flow field 17 is highlighted, which is arranged on an end of the flow field 17 facing the distribution or collection region 20 and extends in the longitudinal direction across the entire flow field 17, which is transversely to the progression of the channels 16 of the flow field 17 here. In the stack 2 of the system 1, this edge region 19 is used to accommodate a respective reinforced region of the membrane electrode assemblies (MEA), which are each arranged between two adjoining bipolar plates 10 of the stack 2. The MEAs are not apparent here. For this reason, the edge region 19 of the flow field is emphasized and identified with a delimiting line. In the known bipolar plates 10, increased compression of the MEA, which is not apparent here, and of the lands 15a and a reduction in the flow cross-section of channels 16 thus usually occur in this edge region 19 of the flow field 17. This can result in an undesirably strong pressure drop between the channels 18 of the distribution or collection region 20 and the channels 16 of the flow field 17, for example.

The present invention primarily relates to an improvement, whereby the disadvantages that can be associated with the above-described increased compression of the known separator plate 10a or bipolar plate 10 or the MEA in the edge region 19 of the flow field 17 are to be decreased or eliminated.

FIG. 3 shows two subimages, each illustrating a section of an accordingly improved separator plate 100a according to the invention in a top view. In each case, the separator plate 100a is one of two individual plates of a bipolar plate 100 according to the invention here. Similarly to the known separator plate 10a, the separator plate 100a is also made of sheet metal, for example stamped or deep-drawn from a stainless metal sheet. For example, this metal sheet can have a thickness of no more than 150 μm, preferably of no more than 100 μm, preferably of no more than 90 μm, and particularly preferably of no more than 80 μm.

Figure 3A:
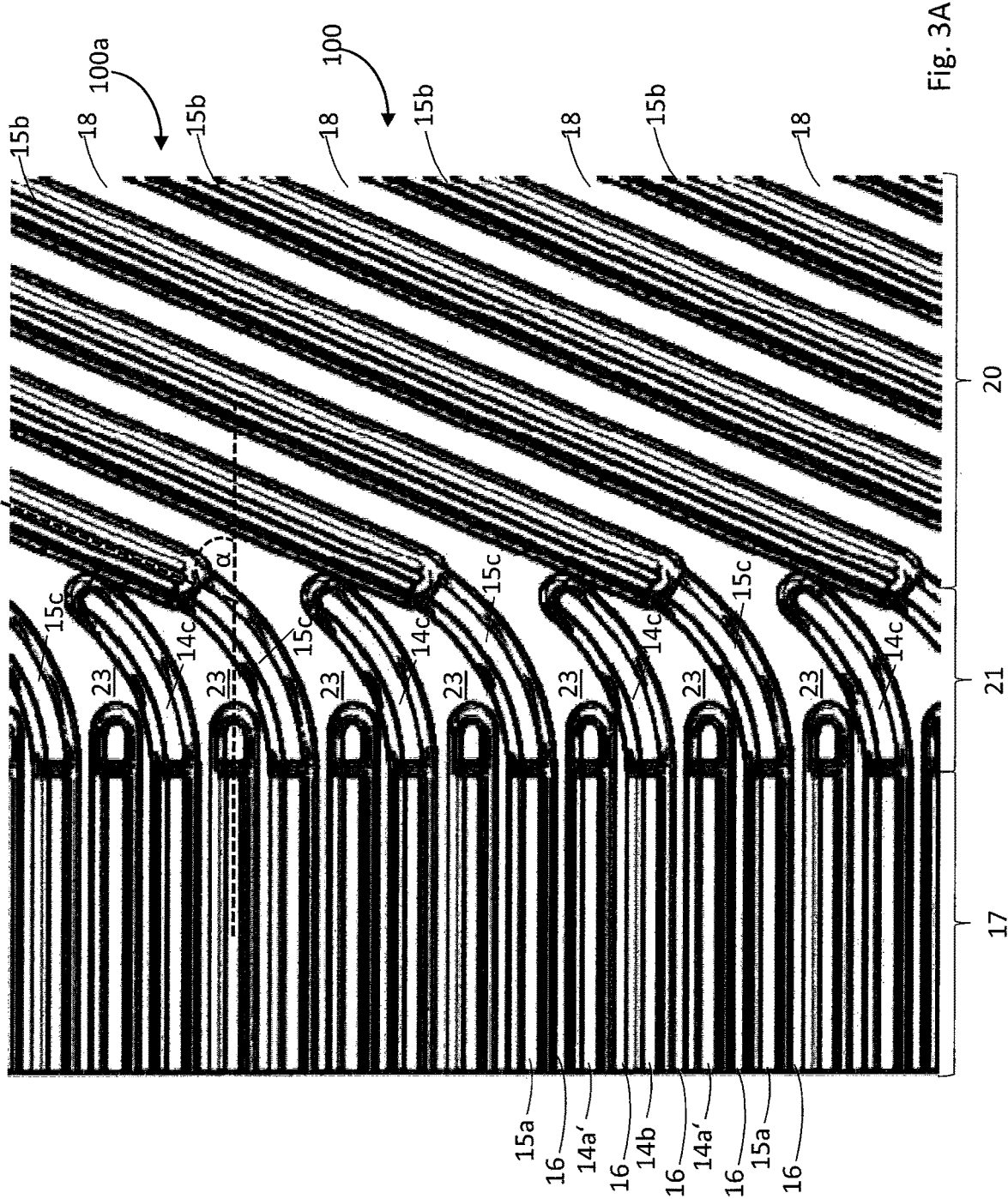
FIG. 3 shows two subimages of a respective detail of one embodiment of a bipolar plate according to the invention in a top view, wherein the bipolar plate comprises a distribution or collection region including lands and channels, a flow field including lands and channels, and a transition region arranged between the distribution or collection region and the flow field, and wherein a maximum height of the transition region is lowered compared to a mean height of the lands of the distribution or collection region and compared to a mean height of the lands of the flow field.

FIG. 3A, in particular, shows a flow field 17 and a distribution or collection region 20 of the separator plate 100a. As before, recurring features are denoted by the same reference numerals. The flow field 17 comprises a plurality of lands 14a', 14b, 15a and channels 16 arranged between these lands and delimited by these lands. The distribution or collection region 20 comprises lands 15b and channels 18 arranged between the lands 15b and delimited by these lands 15b. The lands 15b of the distribution or collection region 20 are continuations of the lands 15a of the flow field 17 (or vice versa). This means that the lands 15a of the flow field 17 transition continuously into the lands 15b of the distribution or collection region 20. Similarly to the separator plate 10a shown in FIG. 2 and known from the prior art, the channels 18 of the distribution or collection region 20 of the separator plate 100a are, for example, in fluid connection with a through-opening 11a of the separator plate 100a or of the bipolar plate 100 (not shown in FIG. 3A), and the channels 16 of the flow field 17 of the separator plate 100a are in fluid connection with the channels 18 of the distribution or collection region 18 of the separator plate 100a. In the region of the flow field 17, the lands 14a', 14b, 15a are aligned parallel with one another. Likewise, the lands 15b are aligned parallel with one another in the area of the distribution or collection region 20. In FIG. 3A, a direction of progression of the lands 14a', 14b, 15a of the flow field 17 forms an angle α of approximately 70 degrees together with a direction of progression of the lands 15b of the distribution or collection region 20.

Compared to the known separator plate 10a according to FIG. 2, the separator plate 100a according to the invention according to FIG. 3A includes a contiguous transition region 21 between the distribution or collection region 20 and the flow field 17. By way of the contiguous transition region 21, the channels 16 of the flow field 17 are in fluid connection with the channels 18 of the distribution or collection region 20. As is described in more detail, in particular, based on FIGS. 4 and 6-8, the contiguous transition region 21 is characterized in that the maximum height $h_{max}$ thereof is lowered compared to a mean height $h_1$ of the lands 14a', 14b, 15a of the flow field 17. Here, the maximum height $h_{max}$ of the transition region 21 is additionally lowered compared to a mean height $h_2$ of the lands 15b of the distribution or collection region 20.

The mean height $h_1$ denotes the mean maximum height of the lands 14a', 14b, 15a of the flow field 17, which is determined in each case along a roof or an apex of the lands 14a, 14b, 15a. Likewise, the mean height $h_2$ denotes the mean maximum height of the lands 15b of the distribution or collection region 20, which is determined along a roof or an apex of the lands 15b. The heights $h_{max}$, $h_1$ and $h_2$ each denote the distance with respect to the planar surface plane of the separator plate 100a which is determined perpendicularly to the planar surface plane of the separator plate 100a. The planar surface plane of the separator plate 100a is given, for example, by an edge of the separator plate 100a or by the flat regions of the metal sheet of which the separator plate 100a is formed which are not deformed as a result of the aforementioned stamping or deep drawing process for forming the lands 14a', 14b, 15a, 15b, and the beads 12a-d. Typically, the following applies to the heights $h_{max}$ and $h_1$: $0.75 \cdot h_1 \leq h_{max} \leq 0.95 \cdot h_1$. And typically the following applies to the heights $h_{max}$ and $h_2$: $0.5 \cdot h_2 \leq h_{max} \leq 0.75 \cdot h_2$.

Deviating from the edge region 19 of the flow field 17 of the known separator plate 10a according to FIG. 2, the contiguous and lowered transition region 21 of the separator plate 100a according to the invention according to FIG. 3A is not only used as a bearing surface, but also to accommodate a reinforced region of an MEA, which is arranged in the stack 2 between adjoining separator plates of the type of the separator plate 100a or between adjoining bipolar plates of the type of the bipolar plate 100. Due to the lowered nature in the transition region 21, the separator plate 100a or the bipolar plate 100 as well as the MEA then experience less compression in the stack 2 compared to the known separator plate 10a or compared to the known bipolar plate 10.

It is clearly apparent from FIG. 3A that the lands 15b of the distribution or collection region 20 continuously transition into the continuations 15a thereof in the flow field 17. The continuous transition of the lands 15b of the distribution or collection region 20 into the lands 15a of the flow field 17 is provided by land sections 15c in the transition region 21, wherein the maximum height $h_{max}$ of the land sections 15c in the transition region 21 is lowered, as described above, with respect to the maximum height $h_1$ of the lands 15a of the flow field 17 and with respect to the maximum height $h_2$ of the lands 15b of the distribution or collection region. Since the land sections 15c establish a connection between the lands 15a and 15b, having directions of progression that are angled relative to one another, the land sections 15c have a curved progression in the transition region 21.

It is further apparent from FIG. 3A that every fourth of the lands 14a', 14b, 15a of the flow field 17 is one of the lands 15a which, coming from the flow field 17, extends into the transition region 21, and completely through the transition region 21, in the form of the land sections 15c. Further lands 14a', 14b are arranged between the lands 15a in the flow field 17. Every second of the lands 14a', 14b, 15a of the flow field 17 is one of the lands 14a' which does not extend into the transition region 21, or extends therein only over a length in the range of the width thereof. Again, every fourth of the lands 14a', 14b, 15a of the flow field 17 is one of the lands 14b which continuously transitions into lowered land sections 14c of the transition region 21. The lands 14b of the flow field 17 thus extend at least partially into the lowered transition region 21 in the form of the lowered land sections 14c. In contrast to the land sections 15c of the transition region 21, however, the land sections 14c of transition region 21 do not transition into lands of the distribution or collection region 20, but end at the transition between the transition region 21 and the distribution or collection region 20.

The land sections 14c, 15c are arranged alternately in the transition region 21, so that one of the land sections 14c is arranged in each case between two land sections 15c, which extend through the transition region 21 and, on both sides of the transition region 21, transition continuously into the lands 15a of the flow field 17 and into the lands 15b of the distribution or collection region 20. The land sections 14c, 15c of the transition region 21 each have the same maximum height $h_{max}$. During compression in the stack 2, for example, this ensures a uniform force introduction into the land sections 14c, 15c of the transition region 21 when the reinforced region of membrane electrode assembly, which the lowered transition region 21 is designed to accommodate, has a substantially constant thickness along the course thereof.

Channels 23 which are delimited by the land sections 14c, 15c are formed between the lowered land sections 14c, 15c of the transition region 21 in the transition region 21. Between two adjoining lands 15a of the flow field 17, which transition into the lands 15b of the distribution or collection region 20 in the form of the land sections 15c in the transition region 21, three further lands are arranged in each case in the region of the flow field 17, namely two of the lands 14a' that barely extend into the transition region 21 and one of the lands 14b that extends into the transition region 21 in the form of the land sections 14c. Only one further land section 14c is arranged between two adjoining land sections 15c in the transition region 21. And, no further lands are arranged between two adjoining lands 15b in the distribution or collection region 20.

In other words, with respect to the separator plate 100a according to FIG. 3A, the following applies with regard to the number $n_S$ of the lands in the flow field 17, to the number $n_U$ of the lands in the transition region 21, and to the number $n_{VS}$ of the lands in the distribution or collection region 21: $n_S = 2 \cdot n_U$ and $n_U = 2 \cdot n_{VS}$. This means that the total number of lands 14a', 14b, 15a in the flow field 17 is greater than the total number of lands or land sections 14c, 15c in the transition region 21, and the total number of lands or land sections 14c, 15c in the transition region 21 is greater than the total number of lands 15b in the distribution or collection region 20. In particular, in each case two of the channels 16 of the flow field 17 thus transition into one of the channels 23 of the transition region 21, and two of the channels 23 of the transition region 21 transition into one of the channels 18 of the distribution or collection region 20.

Accordingly, the distances between directly adjoining lands 14a', 14b, 15a of the flow field 17 and the distances between directly adjoining lands or land sections 14c, 15c of the transition region 21 are different in the area in which the lands 14a' end. Accordingly, the widths of the channels 16 of the flow field 17 and the widths of the channels 23 of the transition region 21 are also different in the area in which the lands 14a' end. The widths of the channels 23 of the transition region 21 are larger than the widths of the channels 16 of the flow field 17. In particular, the overall flow cross-section of all channels 23 of the transition region 21 is larger than the overall flow cross-section of all channels 16 of the flow field 17. Advantageously, no significant pressure drop results at the separator plate 100a between the channels 18 of the distribution or collection region 20 and the channels 16 of the flow field 17, or in any case, such a pressure drop is considerably less than in the case of the known separator plate 10a according to FIG. 2.

Moreover, it is apparent from FIG. 3A that the widths of the channels 23 change in the transition region 21 from the distribution or collection region 20 to the flow field 17.

Likewise, the direction of extension of the channels 23 and of the lands 14c, 15c changes. In this way, it is possible to achieve a targeted guidance of the gas flows from the distribution or collection region 20 to the flow field 17 so that the gases can be distributed as evenly as possible among the channels 16 of the flow field 17.

Similarly to the edge region 19 of the known separator plate 10a according to FIG. 2, the transition region 21 of the separator plate 100a according to FIG. 3A, for example, has a rectangular shape and extends, in the longitudinal direction thereof, that is, transversely to the direction of progression of the lands 14a', 14b, 15a of the flow field 17, along the entire extension of the flow field 17. A width of the transition region 21 determined parallel to the direction of progression of the lands 14a', 14b, 15a of the flow field 17 corresponds, for example, to at least twice or at least three times the distance between two directly adjoining lands of the flow field 17.

Figure 3B:
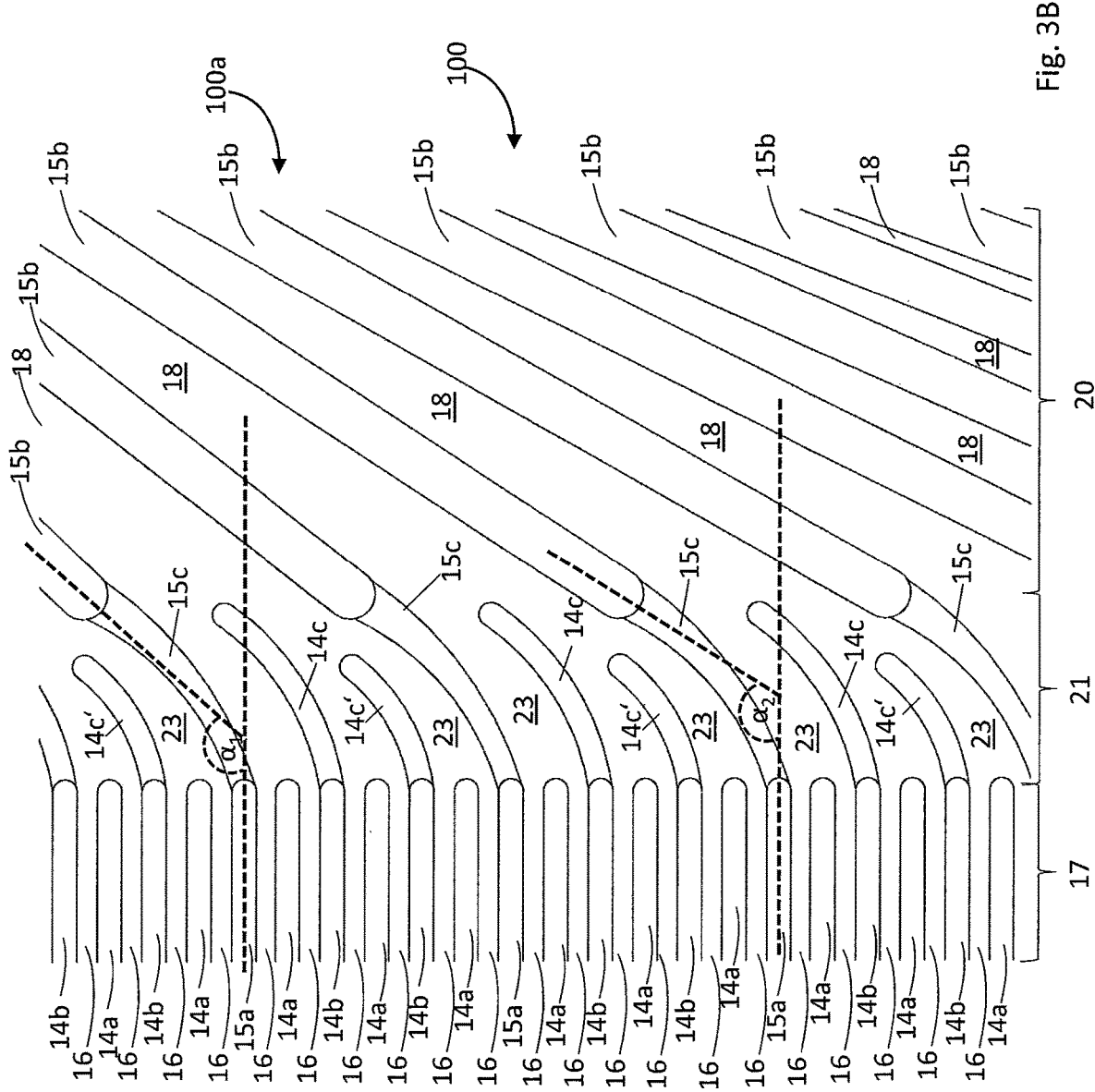

FIG. 3B shows a section in a top view of an alternative separator plate 100a according to the invention, namely a section of the flow field 17, a section of the transition region 21 and a section of the distribution or collection region 20. The exemplary embodiment differs from the preceding one shown in FIG. 3A in that the lands 14a, in contrast to the lands 14a', end at the separating line between the flow field 17 and the transition region 21. In contrast to FIG. 3A, one of six mutually adjoining lands 14a, 14b, 15a is designed as a land 15a that continues into the distribution or collection region, and two of six lands 14a, 14b, 15a end in the transition region 21. The group of these lands includes lands having differing lengths, namely lands 14c', which only extend over a short distance into the transition region, and lands 14c, which have a slightly larger extension in the transition region 21. Again, every second of the lands 14a, 14b, 15a, namely the land 14a, extends only in the flow field 17.

On the other hand, the angle α between the lands 15a of the flow field 17 and the lands 15b of the distribution or collection region 20 changes within the shown section. The angle $\alpha_1$ is larger than the angle $\alpha_2$. The widths of the channels 18 also change in the shown section. All channels 18 widen from the top right to the bottom left, that is, in the direction of the flow field 17. In addition, the channels 18 extending further toward the top have a larger width than the channels 18 extending further toward the bottom. Both the change in the angle and the change in the width of the channels make it possible to distribute medium as efficiently as possible onto a flow field 17 from a through-opening, which is not shown here and is located on the right above the shown section.

Figure 4A:
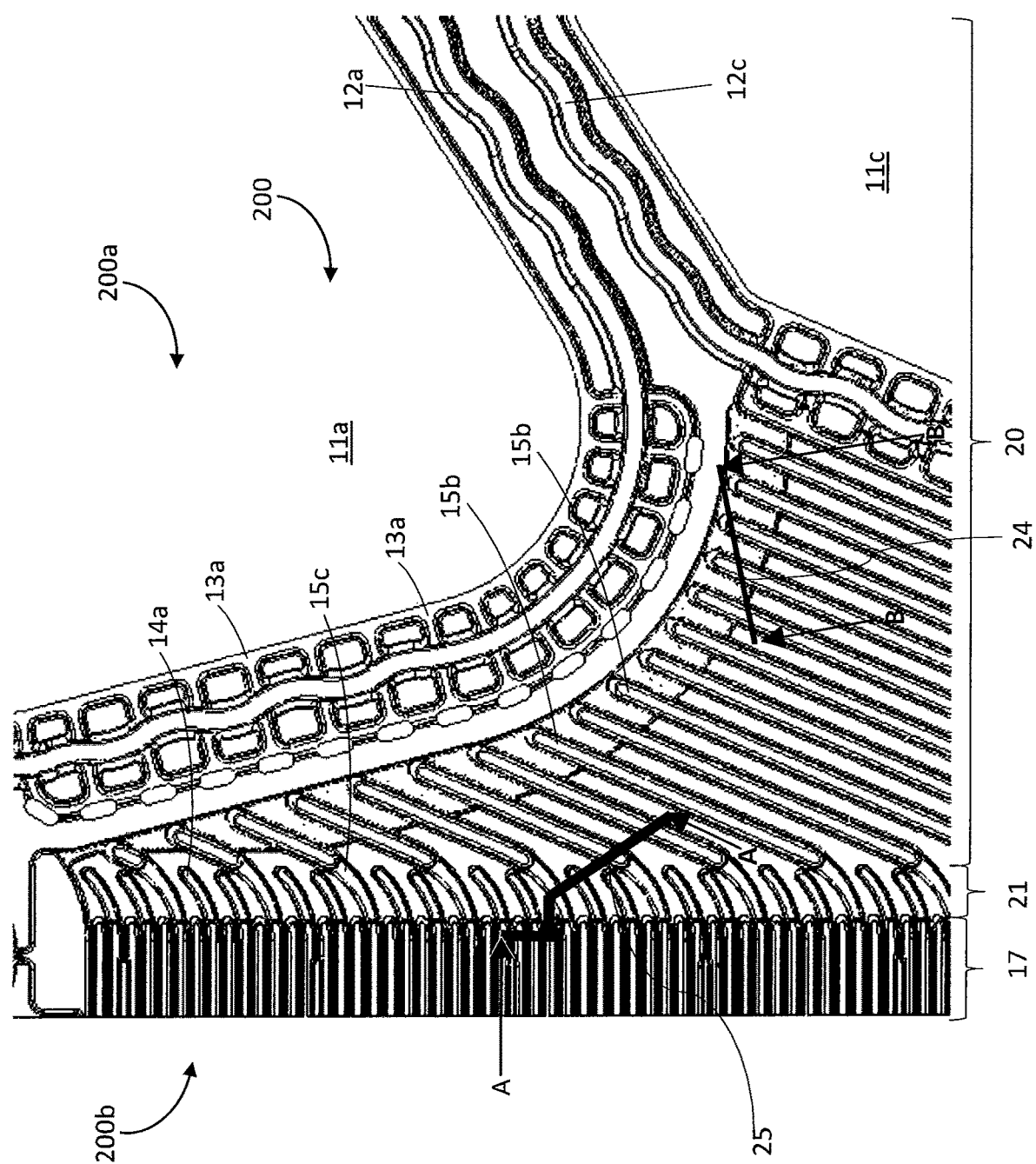
FIG. 4A shows a detail of a further embodiment of a bipolar plate according to the invention including a lowered transition region in a top view.

FIG. 4A shows a section of a separator plate 200a according to the invention, which is an individual plate of a bipolar plate 200 according to the invention. A further separator plate 200b of the bipolar plate 200, which is integrally joined to the separator plate 200a, is hidden in FIG. 4A by the separator plate 200a. The separator plate 200a according to FIG. 4A is a modified embodiment of the separator plate 100a according to FIG. 3, the section, in terms of function, being approximately comparable to section C of the separator plate 10a according to FIG. 2, which is identified with a dotted line. The separator plate 200a according to FIG. 4A also has a transition region 21, which is arranged between the flow field 17 and the distribution or collection region 20 and the maximum height $h_{max}$ of which is lowered compared to the mean height $h_1$ of the lands of the flow field 17 and compared to the mean height $h_2$ of the lands of the distribution or collection region 20, as described above with respect to the separator plate 100a. Thus, the following can also apply to the heights $h_{max}$, $h_1$ and $h_2$ of the separator plate 200a: $0.75 \cdot h_1 \leq h_{max} \leq 0.95 \cdot h_1$ and $0.5 \cdot h_2 \leq h_{max} \leq 0.75 \cdot h_2$.

The separator plate 200a according to FIG. 4A differs from the separator plate 100a according to FIG. 3 in that two lands or land sections 14c, which extend only partially into the transition region 21 or terminate at the transition between the transition region 21 and the distribution or collection region 20, are arranged in the transition region 21 between two adjoining lands or land sections 15c extending completely through the transition region 21.

FIG. 4B shows a sectional view of the separator plate 200a from FIG. 4A, which follows a straight cutting line 24 (B-B) plotted in FIG. 4A. The cutting line 24 extends partially through the distribution or collection region 20 and, together with the straight lands 15b and channels 18 of the distribution or collection region 20, forms an angle of approximately 60 degrees. The cutting plane is oriented perpendicularly to the planar surface plane of the separator plate 200a.

The sectional view of FIG. 4B shows that at least one of the channels 18 of the distribution or collection region 20 has a varying depth so as to influence the flow direction of the medium through this channel 18 in a region denoted by reference numeral 24, wherein the depth of the channel 18 is determined perpendicularly to the planar surface plane of the separator plate 200a. Thus, it corresponds to the distance with respect to the contact plane E, in which the shown separator plate makes contact with an adjoining separator plate when installed. At the same time, the varying depth of the channel 18 in the region 24 thus also influences a flow direction of a coolant into or through the intermediate space 22 on the rear side of the separator plate 200a facing away from the observer of FIG. 4A. The depth of the channel 18 can vary in the region 24 along the progression of the channel 18 and/or transversely to the progression of the channel 18. Analogously, the depth of at least one of the channels 23 of the transition region 21 can vary along a flow direction of a medium through the transition region 21 and/or transversely to the flow direction of the medium through the transition region 21.

FIG. 5 illustrates a sectional view that is similar to the sectional view shown in FIG. 4B, however a section comprising four lands 15b is shown. The depths of the channels are varied further here, so that the channel depth of the channels 18', and in particular 18", is considerably less than that of the channel 18. This creates more space on the rear side, that is, the side of the separator plate 200a facing the plane E, for the coolant-conducting intermediate space 22 extending there in the installed state. Moreover, the bottoms of the channels 18', 18" extend obliquely relative to the plane E, which allows a targeted conduction of coolant, but also of media conducted in the channels 18', 18", resulting in a preferably low pressure drop. In principle, channel bottoms that are offset parallel to the plane E are also possible.

In FIG. 4A, moreover a cutting line 25 (A-A) is highlighted, which extends partially through the flow field 17, the lowered transition region 21 and the distribution or collection region 20, wherein the cutting line 25 extends at least in sections transversely to the lands and channels of the flow field 17, of the transition region 21 and of the distribution or collection region 20.

Figure 6:
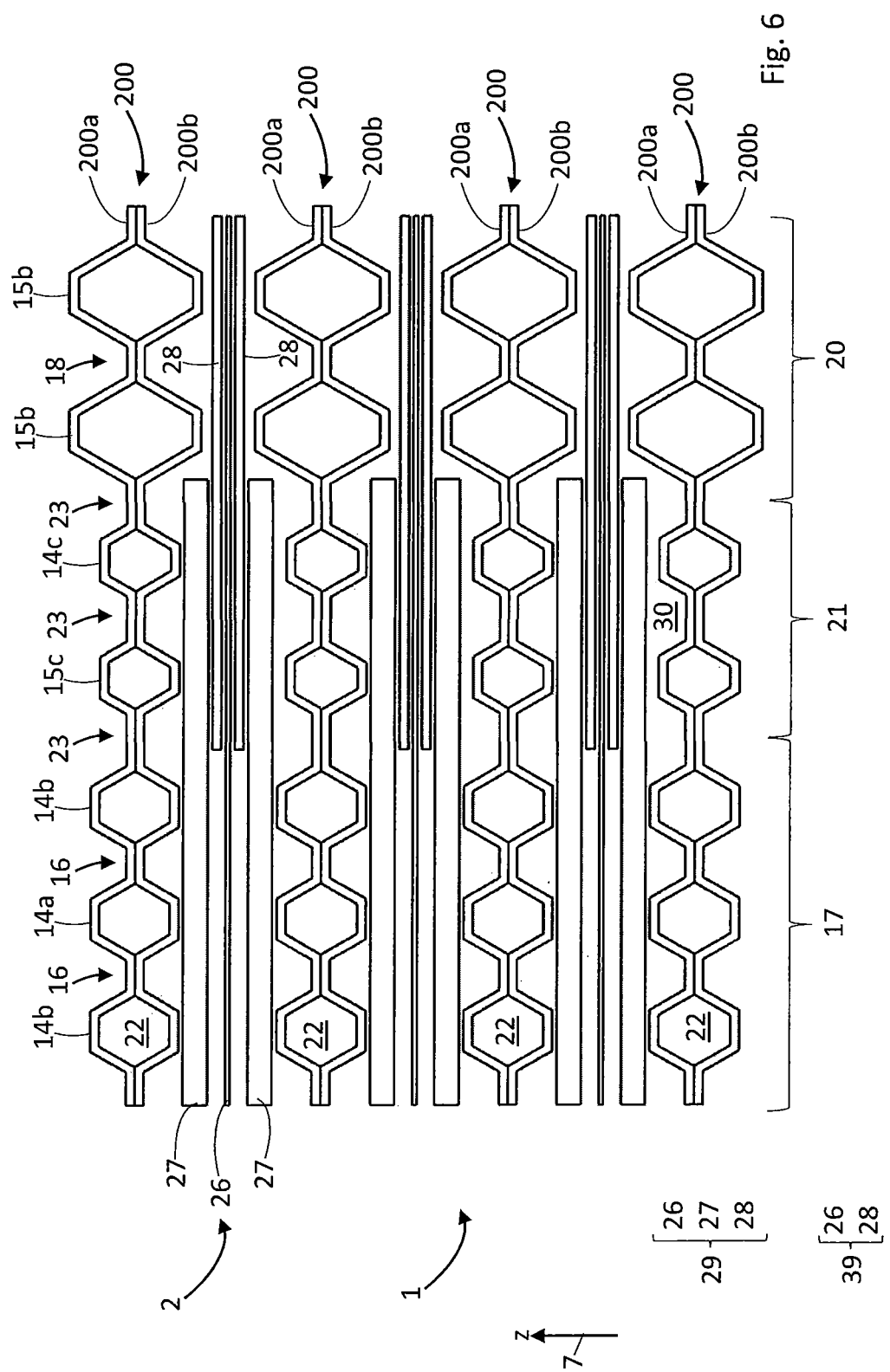
FIG. 6 shows a sectional view through an electrochemical system according to the invention along a cutting line A-A shown in FIG. 4A.

FIG. 6 shows a sectional view of a section of the stack 2 of an electrochemical system 1 according to the invention, for example of the system 1 from FIG. 1. The stack 2 comprises a plurality of identical bipolar plates 200 of the type of the bipolar plate 200 according to FIG. 4. The cutting plane is oriented perpendicularly to the planar surface planes of the bipolar plates 200 or of the separator plates 200a, 200b and follows the cutting line 25 highlighted in FIG. 4A, that is, the line A-A. In particular, the flow fields 17, the transition regions 21, and the distribution or collection region 20 of the separator plates 200a are highlighted.

A respective membrane combination 29, which comprises a membrane electrode 26 including an ionomer and at least one catalyst layer, gas diffusion layers 27 arranged on both sides of the membrane electrode 26 and reinforcing layers 28 arranged on both sides of the membrane electrode 26, is arranged between two adjoining bipolar plates 200 of the stack 2. The membrane electrode 26, the gas diffusion layer(s) 27 and the reinforcing layers 28 together form the membrane electrode assembly (MEA) 39. Only for the sake of clarity, FIG. 6 shows the stack 2 in a state in which the bipolar plates 200 and the membrane combinations 29 are not completely compressed along the z-direction 7, that is, perpendicularly to the planar surface planes of the bipolar plates 200 or of the separator plates 200a, 200b.

In the area of the flow field 17, that is, in the electrochemically active region of the bipolar plates 200, the membrane combinations 29 comprise only the membrane electrode 26 and the gas diffusion layers 27 arranged on both sides of the membrane electrode. As was already mentioned at the outset, the membrane electrode 26 comprises a catalyst coating on both sides. In the area of the distribution or collection region 20, the membrane combinations 29 comprise only the membrane electrode 26 and the reinforcing layers 28 arranged on both sides of the membrane electrode. Only in the transition region 21 of the separator plates 200a do the membrane combinations 29 include a respective reinforced region 30, the reinforced region encompassing the membrane electrode 26, the reinforcing layers 28 arranged on both sides of the membrane electrode 26 and the gas diffusion layers 27 arranged on both sides of the membrane electrode 26 and on both sides of the reinforcing layers 28. Typically, the reinforced region of the membrane combination 29 forms an edge of the membrane combination 29. The membrane combinations 29 have an increased thickness in this reinforced region 30 which is determined along the stacking direction or along the z-direction 7. For example, the thickness of the membrane combinations 29 can be increased by at least 10 percent or by at least 25 percent in the reinforced region 30 compared to the active region.

It is apparent in FIG. 6 that only the respective first separator plate 200a of the bipolar plates 200 includes a contiguous transition region 21, having a maximum height $h_{max}$ that is lowered compared to the mean height $h_1$ of the lands of the flow field and compared to the mean height $h_2$ of the lands of the distribution or collection region 20, as described above. The corresponding region of the second separator plates 200b is not lowered, at least not with respect to the flow field 17, in the embodiment of the bipolar plates 200 shown in FIG. 6.

However, the reinforced region 30 of the membrane combinations is accommodated in the lowered transition region 21 of the respective abutting separator plate 200a, at least toward one side (in FIG. 6, on the underside). During compression of the stack 2 along the z-direction 7, considerably less compression of the membrane electrode assembly and less deformation of the lands of the transition region 21 occur with the separator plates 200 according to the invention according to FIG. 6 than is the case with the known separator plates 100 according to FIG. 2 in the region 19. As described above, the system 1 according to the invention, comprising the bipolar plates 200 according to FIG. 6, even in the compressed state has a flow cross-section in the transition region 21, where the respective reinforced region 30 of the membrane combinations 29 is accommodated, which is considerably larger than the flow cross-section of known systems in the region 19 (see FIG. 2), whereby an undesirable pressure drop in this region can be significantly reduced or completely suppressed in the system according to the invention. However, in the system 1 according to the invention according to FIG. 6 as well, the increase in thickness of the membrane combinations 29 in the reinforced region 30 may be slightly larger than the height reduction in the transition regions 21 of the separator plates 200a.

Figure 7:
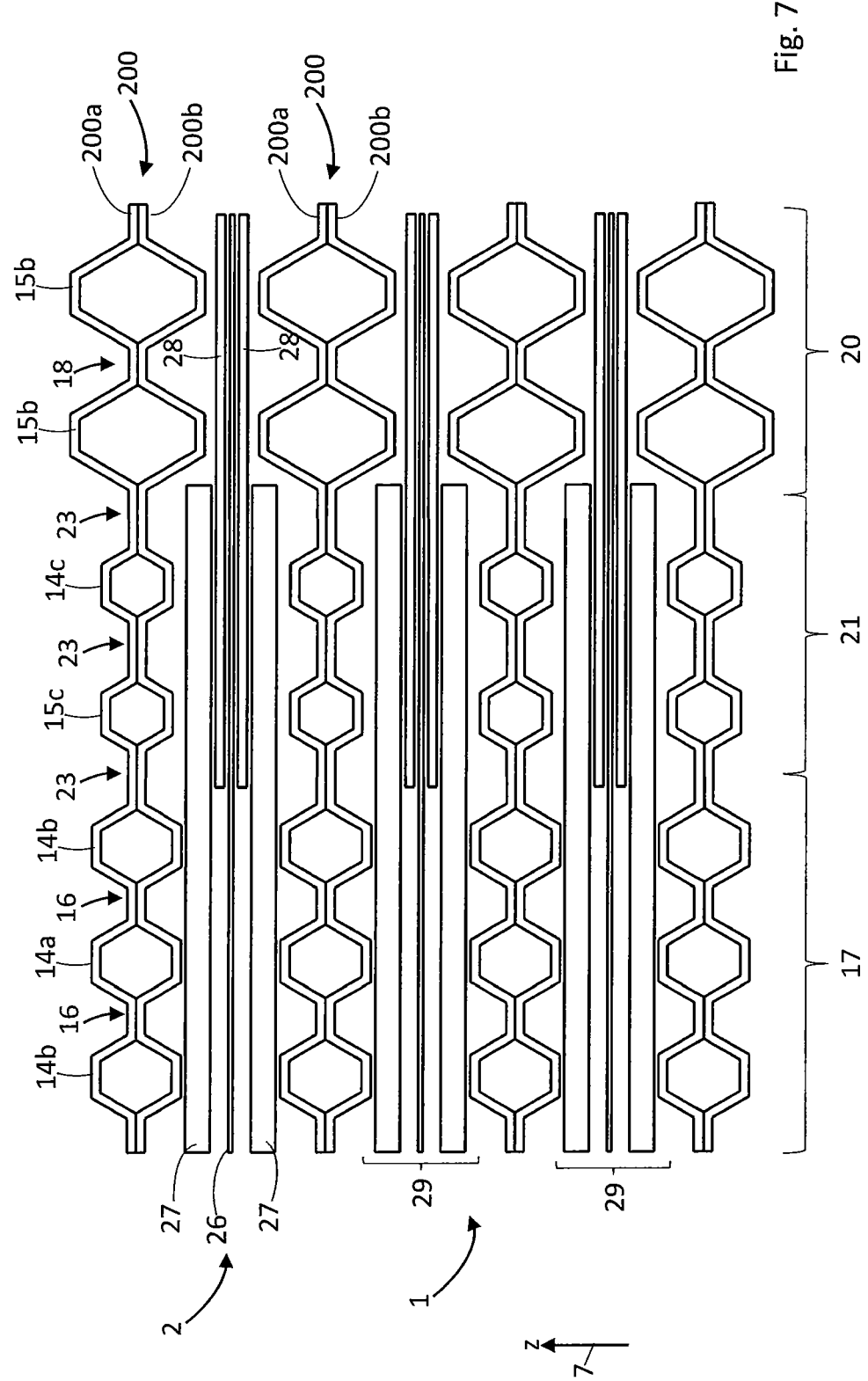
FIG. 7 shows a sectional view through an electrochemical system according to the invention according to a further embodiment.

FIG. 7 shows a modified embodiment of the electrochemical system 1 according to the invention according to FIG. 6, and more particularly again in the sectional view along the cutting line 25 in FIG. 5 already shown in FIG. 6. The system 1 according to FIG. 7 again comprises a plurality of stacked bipolar plates 200 and membrane combinations 29 arranged between the bipolar plates 200, wherein a reinforced region 30 of the membrane combinations 29 is accommodated in the lowered transition region 21 of a separator plate 200a, 200b abutting the respective membrane combination 29.

The embodiment of the system 1 according to FIG. 7 only differs from the embodiment of the system 1 according to FIG. 6 in that in FIG. 7 the second separator plate 200b of the bipolar plates 200 is also designed in a manner corresponding to the first separator plate 200a and includes a transition region 21 that, as described above, is lowered with respect to the flow field 17 and/or with respect to the distribution or collection region 20.

Figure 8:
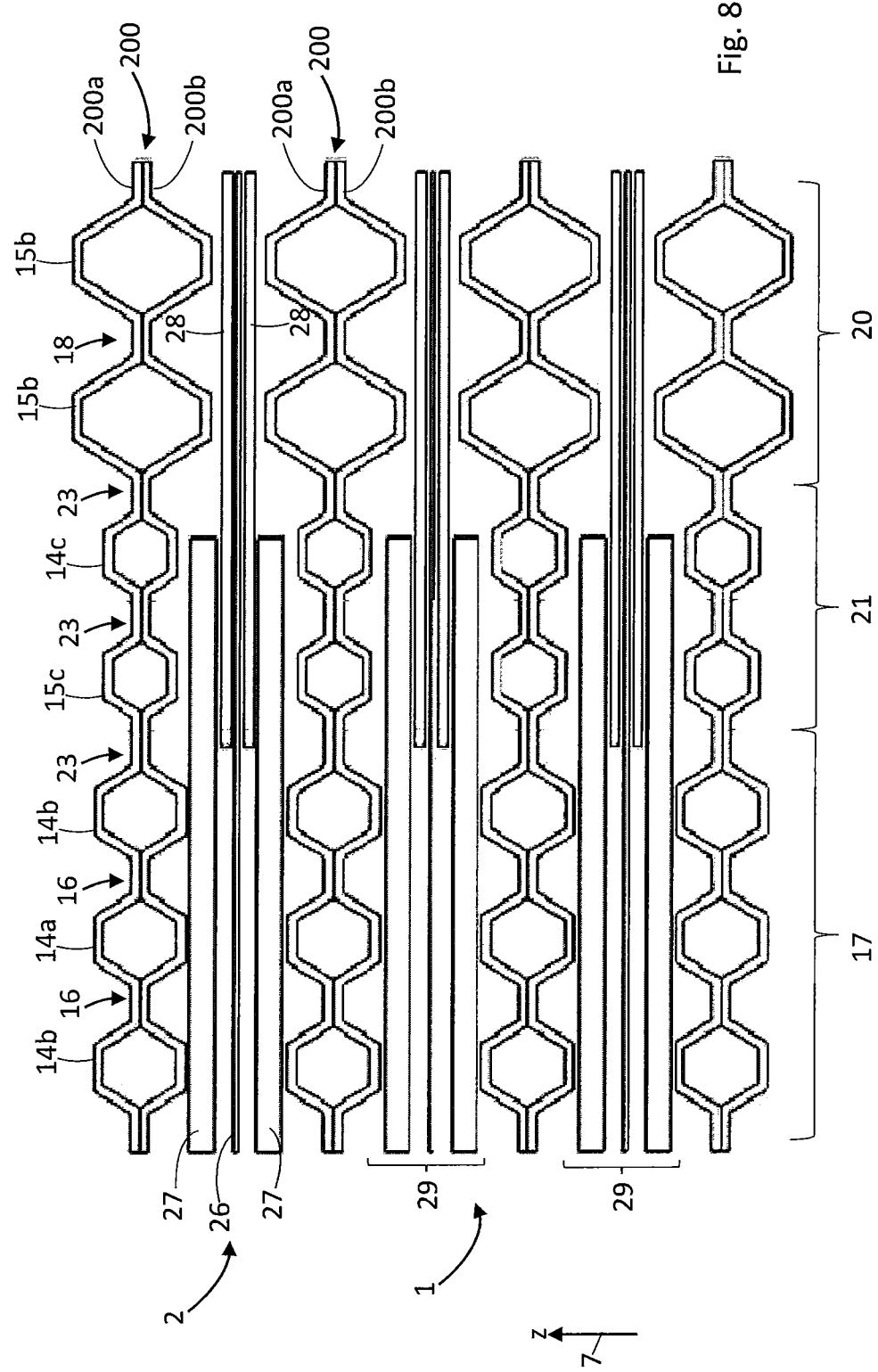
FIG. 8 shows a sectional view through an electrochemical system according to the invention according to a further embodiment.

FIG. 8 shows a modified embodiment of the electrochemical system 1 according to the invention according to FIG. 7, and more particularly again in the sectional view along the cutting line 25 in FIG. 5 already shown in FIG. 6. The system 1 according to FIG. 8 again comprises a plurality of stacked bipolar plates 200 and membrane combinations 29 arranged between the bipolar plates 200, wherein a reinforced region 30 of the membrane combinations 29 is accommodated in the lowered transition region 21 of a separator plate 200a, 200b abutting the respective membrane combination 29.

The embodiment of the system 1 according to FIG. 8 only differs from the embodiment of the system 1 according to FIG. 7 in that in FIG. 8 the gas diffusion layers 27 are spaced apart from the lands 15b of the distribution or collection region 20 parallel to the planar surface plane of the bipolar plates 200 or of the separator plates 200a, 200b, and do not extend to the lands 15b. For example, the distance between the gas diffusion layers 27 and the lands 15b can essentially correspond to a channel width 18. In this way, a respective volume 31 is created between the gas diffusion layers 27 and the lands 15b of the distribution or collection 20 for receiving and removing condensation water.

The invention claimed is:

1. A separator plate for an electrochemical system, comprising:
   at least one first through-opening in the plate for conducting a medium through the plate;
   a distribution or collection region comprising a plurality of lands and channels formed between the lands, which are each in fluid connection with the through-opening;
   a flow field in fluid connection with the through-opening, the flow field comprising guiding structures for guiding a medium through the flow field and the guiding structures comprising lands, and the lands of the flow field have a mean height $h_1$ determined perpendicularly to the planar surface plane of the plate; and a contiguous, lowered transition region arranged between the distribution or collection region and the flow field in such a way that, for each of the channels of the distribution or collection region, medium flowing from the channel of the distribution or collection region into the flow field, or from the flow field into the channel of the distribution or collection region, flows through the transition region, and the transition region comprising lands formed by the lands of the distribution or collection region and/or the lands of the flow field extending into the transition region and transitioning to a maximum height $h_{max}$ in the transition region where $h_{max} \leq 0.95\ h_1$, and the maximum height $h_{max}$ determined perpendicularly to the planar surface plane of the plate.

2. The separator plate according to claim 1, wherein the lands of the distribution or collection region have a mean height $h_2$ determined perpendicularly to the planar surface plane of the plate, where applies: $h_{max} \leq 0.9\ h_2$.

3. The separator plate according to claim 1, wherein the lowered transition region has a straight progression transversely to the flow direction of the medium through the transition region, or substantially transversely to the flow direction of the medium through the transition region.

4. The separator plate according to claim 1, wherein the lands of the flow field extend into the transition region to form the lands of the transition region and the lands of the transition region curve from the path of the lands of the flow field.

5. The separator plate according to claim 1, wherein the lands of the transition region are formed by both the lands of the distribution or collection region and the lands of the flow field extending into the transition region.

6. The separator plate according to claim 5, wherein at least one of the lands of the transition region connects lands of the distribution or collection region transition with lands of the flow field to form a continuous land.

7. The separator plate according to claim 6, wherein lands of the distribution or collection region extend into the transition region to form the lands of the transition region and the lands of the transition region curve from the path of the lands of the distribution or collection region.

8. The separator plate according to claim 7, wherein at least every twelfth of the lands of the flow field extends into the lowered transition region.

9. The separator plate according to claim 8, wherein at least every sixth of the lands of the flow field extends into the distribution region.

10. The separator plate according to claim 9, wherein the lands extending through the transition region and/or the lands extending into the transition region have the same maximum height in the transition region.

11. The separator plate according to claim 10, wherein the flow field comprises a number $n_1$ of channels, and the distribution or collection region comprises a number $n_2$ of channels, where applies: $n_1 \geq 2\ n_2$, preferably $n_1 \geq 3\ n_2$.

12. The separator plate according to claim 1, wherein a depth of at least one channel which is determined perpendicularly to the planar surface plane of the plate varies so as to influence the flow direction of the medium in the transition region and/or distribution or collection region.

13. The separator plate according to claim 12, wherein the depth of at least one channel varies along the progression thereof in the transition region and/or the distribution or collection region.

14. The separator plate according to claim 13, wherein the depth of at least one channel varies in the transition region and/or distribution or collection region transversely to the flow direction of the medium.

15. The separator plate according to claim 1, comprising a bead that completely encloses the through-opening so as to seal the through-opening, wherein the bead includes passages or conducting a medium through the bead, and the channels of the distribution or collection region are in fluid connection with the through-opening by way of the passages in the bead.

16. A bipolar plate for an electrochemical system, comprising a first separator plate, comprising:
at least one first through-opening in the plate for conducting a medium through the plate;
a distribution or collection region comprising a plurality of lands and channels formed between the lands, which are each in fluid connection with the through-opening;
a flow field, which by way of the distribution or collection region is in fluid connection with the through-opening and comprises guiding structures for guiding a medium through the flow field and the guiding structures comprising lands, and the lands of the flow field have a mean height $h_1$ determined perpendicularly to the planar surface plane of the plate; and
a contiguous, lowered transition region, which is arranged between the distribution or collection region and the flow field in such a way that, for each of the channels of the distribution or collection region, medium flowing from the channel of the distribution or collection region into the flow field, or from the flow field into the channel of the distribution or collection region, flows through the transition region, and the transition region comprising lands formed by the lands of the distribution or collection region and/or the lands of the flow field extending into the transition region and transitioning to a maximum height $h_{max}$ within the transition region where $h_{max} \leq 0.95\ h_1$, and $h_{max}$ is determined perpendicularly to the planar surface plane of the plate;
and comprising a second separator plate, which includes at least one second through-opening, wherein the first separator plate and the second separator plate are joined, and the at least one first through-opening of the first separator plate and the at least one second through-opening of the second separator plate are aligned with one another so as to form at least one through-opening in the bipolar plate.

17. The bipolar plate according to claim 16, wherein only the first separator plate includes a lowered transition region wherein the following applies to the maximum height $h_{max}$ of the transition region of the first separator plate and to the maximum height $h_1$ of the lands of the flow field of the second separator plate: $h_{max} \leq 0.9\ h_1$.

18. The bipolar plate according to claim 16, wherein the following applies to the maximum height $h_{max,1}$ of the transition region of the first separator plate and to the maximum height $h_{11}$ of the lands of the flow field of the first separator plate: $0.85\ h_{11} \leq h_{max,1} \leq 0.95\ h_{11}$; and wherein the following applies to the maximum height $h_{max,2}$ of the transition region of the second separator plate and to the maximum height $h_{12}$ of the lands of the flow field of the second separator plate: $0.85\ h_{12} \leq h_{max,2} \leq 0.95\ h_{12}$.

19. The bipolar plate according to claim 18, wherein the first separator plate and the second separator plate enclose an intermediate space for coolant conduction.

20. An electrochemical system comprising:
a plurality of stacked bipolar plates comprising a contiguous transition region arranged between a distribution or collection region and a flow field, the transition region comprising lands, and a maximum height $h_{max}$ of the transition region is less than or equal to 0.95 of structures of the flow field, and
a plurality of membrane electrode assemblies arranged between the stacked bipolar plates, wherein the membrane electrode assemblies each comprise:
an active region having a first thickness, and
a reinforced region having a second thickness that is increased compared to the first thickness, and the membrane electrode assemblies and the bipolar plates are arranged in such a way that the respective reinforced region of the membrane electrode assemblies is accommodated in the lowered transition region of a bipolar plate abutting the respective membrane electrode assembly.

21. The electrochemical system according to claim 20, wherein the membrane electrode assemblies, in the active region, comprise a respective membrane electrode, and the membrane electrode assemblies, in the reinforced region, additionally comprise at least one reinforcing layer and at least one adhesive layer.

* * * * *